United States Patent
Talbot et al.

[15] 3,673,232
[45] June 27, 1972

[54] DICYCLOPENTADIENYL IRON COMPOUNDS

[72] Inventors: Meldon L. Talbot; Theodore T. Foster, both of Boulder, Colo.

[73] Assignee: Syntex Corporation, Panama, Panama

[22] Filed: April 1, 1970

[21] Appl. No.: 24,863

[52] U.S. Cl. ........................................260/439 CY, 260/999
[51] Int. Cl. ................................................C07j 15/02
[58] Field of Search ........................................260/439 CY

[56] References Cited

UNITED STATES PATENTS

| | | | |
|---|---|---|---|
| 3,035,978 | 5/1962 | Jones et al. | 167/68 |
| 3,437,634 | 4/1969 | Neuse | 260/47 |

OTHER PUBLICATIONS

Rosenblum, Chemistry of the Iron Group Metallocenes Interscience Publishers, N.Y., N.Y., 1967, p. 146–147
Pauson et al., J. Chem. Soc., 1962, p. 3880–3883

*Primary Examiner*—James E. Poer
*Assistant Examiner*—A. P. Demers
*Attorney*—Evelyn K. Merker, Gerard A. Blaufarb and Walter H. Dreger

[57] ABSTRACT

Production of dimers of dicyclopentadienyl iron compounds by the reaction of a dicyclopentadienyl iron compound and a ketonic coupling agent in the presence of an acid catalyst in an organic solvent. The process involves a two-phase system wherein one phase comprises said ketonic coupling agent, a strong acid, and a polar organic solvent; and the second phase comprises said iron compound which is slightly soluble in the first phase. The product dimers of dicyclopentadienyl iron compounds are useful as hematinic agents and in the cure of polymers. Those compounds substituted in at least one cyclopentadienyl ring are novel.

15 Claims, No Drawings

DICYCLOPENTADIENYL IRON COMPOUNDS

This invention relates to dimers of dicyclopentadienyl iron compounds wherein each individual monomer dicyclopentadienyl iron component is separated by and linked through a fully substituted methylene bridge and to a process for preparing these compounds which utilizes a two-phase system.

The dimeric dicyclopentadienyl iron compounds of the present invention are represented by Formula (A):

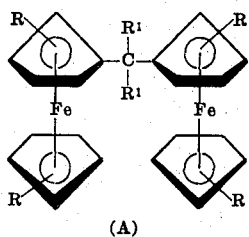

(A)

wherein each R, independently, is hydrogen, halo, alkyl, cycloalkyl, aryl, or heterocyclic and each $R^1$, independently, is alkyl, aryl, or aralkyl.

Those compounds of the present invention represented above by Formula (A), wherein at least one R is other than hydrogen, are novel. These compounds, by virtue of containing substituents in at least one cyclopentadienyl ring, exist in several isomeric forms. The possibility of this isomerism, as opposed to the unsubstituted compounds in which each cyclopentadienyl ring carbon is equivalent permits and suprisingly results in unexpected physical properties.

The process of the present invention by which the compounds of the present invention are prepared comprises a two-phase system for the reaction of a monomeric dicyclopentadienyl iron compound together with a ketonic coupling agent in the presence of a strong acid catalyst in a polar organic solvent. The acid catalyst and the polar solvent make up one phase of the system and the dicyclopentadienyl iron compound makes up the second phase of the system. The ketonic coupling agent is slowly added with agitation to the two-phase system, the second phase being slightly soluble in the first phase.

By using the two-phase system of the present invention, an excellent yield of the dimeric condensation product is obtained. In addition, recovery problems of the dimeric product are minimized in that the dimeric product is essentially insoluble in the first phase of the system. Further, the strong acid catalyst and the polar organic solvent can be reused several times which reduces chemical disposal problems and provides a more economical process.

In the practice of the process of the present invention, there is first prepared a mixture of the polar organic solvent and the acid catalyst. Generally, the addition of the acid to the organic solvent requires the use of external cooling. The particular strong acid used is not critical and can be either an organic or inorganic acid, such as sulfuric acid, phosphoric acid, p-toluenesulfonic acid, and the like. The acid can be technical, research, or higher purity grade material. The organic solvent employed is not critical so long as the combination of the acid and organic solvent is substantially insoluble in the monomeric dicyclopentadienyl iron compound. As a guide, the organic solvent should be selected from polar organic solvents, such as lower saturated aliphatic alcohols, e.g., methanol, ethanol, isopropanol, or n-butanol and mixtures thereof, or other polar organic solvents, such as acetonitrile, dimethylsulfoxide, and the like. The mixture of the acid and polar organic solvent can also contain water, that is, the mixture need not be anhydrous. It is preferable, however, to keep the water content of the acid-organic solvent mixture below about 50 percent by weight of the mixture.

To the mixture of the acid catalyst and the polar organic solvent there is added the dicyclopentadienyl iron compound. The addition of the dicyclopentadienyl iron compound results in the formation of a two-phase system by reason of the slight solubility of the iron compound in the acid-polar organic solvent mixture. In those instances, where the dicyclopentadienyl iron compound is a solid material, it is preferable to form a solution of the iron compound in an organic solvent prior to addition to the acid-polar organic solvent mixture. The organic solvent used to dissolve the iron compound should be only slightly soluble in the acid-polar organic solvent mixture. As a guide, there can be used non-polar organic solvents, such as benzene, toluene, xylene, pentane, and the like.

There is next added a ketonic coupling agent which is soluble in the acid-polar organic solvent mixture. The particular ketonic coupling agent employed is not critical so long as it is a coupling agent which is soluble in the acid-solvent mixture and which, in the presence of a strong acid, generates a fully substituted methylene radical to bridge two monomeric dicyclopentadienyl iron compounds in the formation of the dimeric product. Suitable ketonic coupling agents include:

| | |
|---|---|
| Methyl n-propyl ketone | Methyl isopropyl ketone |
| Diethyl ketone | Methyl n-butyl ketone |
| Methyl isobutyl ketone | Methyl s-butyl ketone |
| Methyl t-butyl ketone | Ethyl n-propyl ketone |
| Methyl n-amyl ketone | Methyl isoamyl ketone |
| 4-Methyl-2-hexanone | 3-Methyl-2-hexanone |
| 3-Ethyl-2-pentanone | Methyl neopentyl ketone |
| Methyl t-amyl ketone | 3,4-Dimethyl-2-pentanone |
| Ethyl n-butyl ketone | Ethyl isobutyl ketone |
| Ethyl s-butyl ketone | Ethyl t-butyl ketone |
| Di n-propyl ketone | n-Propyl isopropyl ketone |
| Diisopropyl ketone | Methyl n-hexyl ketone |
| Methyl isohexyl ketone | 3-Methyl-2-heptanone |
| 3,4-Dimethyl-2-hexanone | 4Ethyl-2-hexanone |
| 3-methyl-3-ethyl-2-pentanone | |
| | Ethyl isoamyl ketone |
| 5-Methyl-3-heptanone | Ethyl neopentyl ketone |
| n-Propyl n-butyl ketone | n-Propyl isobutyl ketone |
| n-Propyl t-butyl ketone | Isopropyl s-butyl ketone |
| Isopropyl t-butyl ketone | Methyl n-heptyl ketone |
| 4-Methyl-2-octanone | 3-Methyl-3-ethyl-2-hexanone |
| Ethyl n-hexyl ketone | 5-Ethyl-3-heptanone |
| Di-n-butyl ketone | n-Butyl isobutyl ketone |
| n-Butyl t-butyl ketone | Diisobutyl ketone |
| Isobutyl s-butyl ketone | Isobutyl t-butyl ketone |
| Isopropyl neopentyl ketone | Isopropyl t-amyl ketone |
| Di-t-butyl ketone | Methyl n-octyl ketone |
| sym-Tetraethylacetone | Di-n-amyl ketone |
| Methyl n-decyl ketone | Di-n-hexyl ketone |
| Methyl n-undecyl ketone | Di-n-heptyl ketone |
| Di-n-octyl ketone | Methyl n-heptadecyl ketone |
| Di-n-nonyl ketone | di-n-decyl ketone |
| Acetophenone | Methyl benzyl ketone |
| Phenyl ethyl ketone | o-Methylacetophenone |
| Phenyl n-propyl ketone | Phenyl isopropyl ketone |
| Ethyl benzyl ketone | Benzylacetone |
| 3-Phenyl-2-butanone | p-Methylpropiophenone |
| o-Ethylacetophenone | m-Ethylacetophenone |
| p-Ethylacetophenone | 2,4-Dimethylacetophenone |
| 2,5-Dimethylacetophenone | Phenyl n-butyl ketone |
| 3-Phenyl-2-pentanone | Phenyl isobutyl ketone |
| 5-Phenyl-3-pentanone | 3-Methyl-4-phenyl-2-butanone |
| 2,4,5-Trimethylacetophenone | Phenyl neopentyl ketone |
| m-Propylpropiophenone | p-n-Butylacetophenone |
| p-s-Butylacetophenone | 2-Methyl-5-isopropylacetophenone |
| Benzophenone | Phenyl benzyl ketone (desoxybenzoin) |
| p-Methylbenzophenone | Dibenzyl ketone |
| Di-o-tolyl ketone | p-Ethylbenzophenone |
| p-Ethylbenzophenone | p-n-Propylbenzophenone |
| p-t-Butylbenzophenone | p-s-Amylbenzophenone |

The addition of the ketonic coupling agent to the two-phase system is preferably accomplished at a relatively slow rate and with stirring or other agitation means. When the ketonic coupling agent is added at a fast rate, unreacted ketonic coupling agent may accumulate which can react with dimeric product to form trimeric or polymeric products. Thus, to minimize formation of trimers and polymers, the ketonic coupling agent is added at a relatively slow rate with agitation and at an elevated temperature.

Although the reaction can be conveniently carried out at from about room temperature to the reflux temperature of the mixture, it is preferable to first heat the two-phase system to about room temperature, for example, about 55° C. to the reflux temperature of the system, and then add the ketonic coupling agent at a relatively slow rate while maintaining an elevated temperature, e.g., the reflux temperature. Upon completion of the addition of the ketonic coupling agent, heating of the reaction mixture is conveniently continued until the reaction is complete as followed by the ratio of dimer product to unreacted monomer as determined by, for example, vapor phase chromatography.

The reaction is generally complete in from about 0.5 hours to 4 hours, the optimum time being dependent upon the particular cyclopentadienyl iron compound used, efficiency of stirring, rate of addition of the ketonic coupling agent, size of batch and temperature. The most optimum temperature, reaction time and rate of addition of the ketonic coupling agent for a particular dicyclopentadienyl iron compound and ketonic coupling agent is easily determinable by one of ordinary skill in the art giving due consideration to the aforementioned factors.

The proportions of the reactants employed are not critical, some of the desired product being formed when employing any proportions thereof. In the preferred embodiments, the amount of strong acid employed ranges from about 1 to about 5 moles per mole of dicyclopentadienyl iron compound. Similarly, the amount of dicyclopentadienyl iron compound employed ranges from about 1 to about 4 moles per mole of ketonic coupling agent.

While not essential and critical to the practice of the present invention, the reaction, in the preferred embodiments, is conducted under an inert atmosphere such as can be provided by nitrogen, argon, and the like.

Upon completion of the reaction, the dimeric product is easily separated from the reaction mixture due to its relative insolubility with the first phase of the system, Hence, the dimeric product can be separated, for example, simply by decanting. Thereafter, depending upon the degree of purity sought, it can be further purified by, for example, distillation to remove the lower boiling monomeric iron compound and any non-polar solvent which may have been used. The remaining acid-organic solvent mixture following this separation can be reused several times, if desired, i.e., four or five times, with good results.

Dicyclopentadienyl iron compounds are also referred to in the literature as ferrocene and ferrocene derivatives. The process of the present invention can be used for the formation of a dimeric condensation product of dicyclopentadienyl iron compounds in general. Dicyclopentadienyl iron starting compounds can be prepared as described in U.S. Pat. Nos. 2,680,756; 2,791,597; 2,804,468; 2,834,796; 3,092,647; 3,285,946; 3,294,685; 3,382,268; and 3,383,314. Specific examples of the useful starting compounds are dicyclopentadienyl iron (ferrocene), di(methylcyclopentadienyl)iron, di(ethylcyclopentadienyl)iron, methylferrocene, ethylferrocene, n-butylferrocene, dihexylferrocene, phenylferrocene, m-tolylferrocene, didecylferrocene, dicyclohexylferrocene, dicyclopentylferrocene, t-butylferrocene, di-t-butylferrocene, and the like.

In the present invention specification and claims, the term "alkyl" refers to an alkyl group, branched or straight chain, of one to 10 carbon atoms, such as methyl, ethyl, propyl, hexyl, heptyl, octyl, nonyl, and decyl, the various isomers thereof. Alkyl of one to four carbon atoms are preferred. The term "cycloalkyl" refers to a lower cycloalkyl group of three to seven carbon atoms, such as cyclopropyl, cyclobutyl, cyclopentyl, cyclohexyl and cycloheptyl. The term "aryl" refers to a substituted or unsubstituted phenyl radical, for example, phenyl; lower alkyl substituted phenyl such as tolyl, ethylphenyl, and triethylphenyl; halophenyl such as p-chlorophenyl; nitrophenyl such as p-nitrophenyl; and p-cyanophenyl. In the present context, the term "aralkyl" refers to an aryl substituted methyl or ethyl group, aryl being as defined above. Included thereof is benzyl, phenethyl, and so forth. The term "heterocyclic" refers to a nitrogen, sulfur, or oxygen containing, saturated or unsaturated cycle such as pyrryl, pyridyl, furfuryl, piperidinyl, pyrrolidinyl, thiophene, and the like. Although any aryl, aralkyl, or heterocyclic substituted dicyclopentadienyl iron compound can be used, the aryl, aralkyl, or heterocyclic group generally contains up to about 15 carbon atoms.

The dimeric products (including isomeric mixtures) prepared by the process of the present invention are useful in the cure of polymers, and can be used as such in the same manner as described in U.S. Pat. No. 3,437,634 which broadly discloses some of these compounds. The compounds of the present invention are also hematinic agents useful for the treatment of iron deficiency anemia. They can be used in accordance therewith in the same way as ferrocene is thus used—see U.S. Pat. No. 3,035,978.

The process of the present invention, which has been discussed hereinabove with respect to formation of the dimer products, can also be advantageously used for the production of the corresponding trimeric and tetrameric products. The formation of trimers and tetramers is favored by choosing a solvent in the first phase of the system in which the monomeric iron compound is more soluble, i.e., a less polar solvent and/or by reversing the addition of the ketonic coupling agent and dicyclopentadienyl iron compound and/or increasing the rate of addition of the ketonic coupling agent.

The following examples serve to further illustrate the manner by which the present invention can be practiced. As such, however, they should not be construed as limitations upon the overall scope hereof.

EXAMPLE 1

A mixture of 213 g. of methyl alcohol and 196 g. of concentrated sulfuric acid (reagent grade) is prepared, under nitrogen, maintaining the temperature below about 50° C. To this mixture are rapidly added 214 g. of ethylferrocene. The resulting mixture is heated to 80° to 82° C. and 32 g. of acetone are added dropwise with rapid stirring over a period of 45 to 60 minutes. The reaction mixture is held at a temperature of 80° to 82° C. for a total of 6 hours including the time required for addition of the acetone. The reaction mixture is allowed to cool and 200 ml. of Skellysolve C (a mixture of hydrocarbons having an sp. gr. (60° F.) 0.726, Aniline point 130.2° F. and Kauri butanol value 36.2) are added thereto. The organic layer is separated and a small amount of sodium carbonate (20 g.) and absorptive magnesium silicate (3 g.) are added and the mixture filtered while keeping it cooled below about 25° C. The filtrate is distilled until unreacted ethylferrocene is removed to provide 2,2-bis(ethyldicyclopentadienyl iron)propane having a viscosity of 399 centistokes (Cannon-Fenske method at 100° F.), in 72 percent yield which corresponds to 83 percent conversion. The six isomers thereof are separated and isolated by preparative gas-liquid chromatography (GLC).

EXAMPLE 2

Into a nitrogen purged reflux vessel containing 38.8 g. methyl alcohol, there is added, under nitrogen atmosphere, 36.7 g. parts sulfuric acid (66° Baume) holding the temperature below 50° C. To this mixture is rapidly added 45.4 g. n-butylferrocene. The resulting mixture is heated to reflux and 7.4 g. acetone are added without permitting the reaction temperature drop below about 77° C. The reaction mixture is refluxed with stirring for a total of 3 hours which includes the time used for adding acetone. The reaction mixture is cooled and allowed to settle. The organic layer is drawn off leaving the sulfuric acid-methanol phase for re-use.

The remaining sulfuric acid-methanol solution is heated to 85° to 90° C. and then 45.5 g. of n-butylferrocene is added rapidly. This mixture is heated to reflux and 7.5 g. acetone added without permitting the temperature drop below about 77° C. The reaction mixture is heated for a total of 3 hours as before and then cooled and allowed to settle. The organic layer is drawn off leaving the sulfuric acid-methanol for re-use.

The recycle procedure of the preceding paragraph is repeated two additional times and the organic layer of all four cycles combined. To the combined organic layer is added 108 g. Skellysolve C. 15 g. sodium carbonate, and 2.2 g. absorptive magnesium silicate. The mixture is stirred, filtered, and the filter washed 3 × 12 g. Skellysolve C. The filtrate is distilled to remove unreacted n-butylferrocene to yield 2,2-bis(n-butyldicyclopentadienyl iron) propane having a viscosity of 354 centistokes (Cannon-Fenske method at 100° F.).

EXAMPLE 3

The process of Example 1 is repeated with the exception that methanol is replaced with an equal amount of ethanol/methanol (1:1) with similar results.

The process of Example 1 is repeated with the exception that p-toluene sulfonic acid is employed in equivalent amounts in lieu of sulfuric acid with similar results.

By using an equivalent amount of methyl isobutyl ketone in lieu of acetone in the process of Example 1, there is similarly obtained the 2,2-bis(ethyldicyclopentadienyl iron)-4-methylpentane product having a viscosity of 740 centistokes (Cannon-Fenske method at 100° C.).

EXAMPLE 4

A mixture of 207 g. of methyl alcohol and 196 g. concentrated sulfuric acid is prepared, under nitrogen, while maintaining the temperature below 50° C. t-Butylferrocene (214 g.) is added and the mixture heated to 65° C. Acetone (42 g.) is added slowly with rapid stirring while maintaining the temperature at about 65° C. (total addition time of about 45 to 60 minutes). Stirring is continued at about 65° C. for a total time of 5 hours. Heating and stirring is discontinued and the reaction mixture is allowed to stand. The bottom organic layer is removed and to its is added 200 g. of Skellysolve C, 20 g. of sodium carbonate, and 3 g. absorptive magnesium silicate. The resulting mixture is stirred and then filtered at room temperature. The filtrate is distilled to remove Skellysolve C and unreacted t-butylferrocene to yield 2,2-bis(t-butyldicyclopentadienyl iron) propane in 69 percent yield (86 percent conversion) having a viscosity of 67 centistokes (Cannon-Fenske Method at 210° F.)

Example 5

The process of Example 1 is repeated with the exception that n-heptane is used in place of Skellysolve C with similar results.

EXAMPLES 6 to 14

In accordance with the methods of the present invention, the following are carried out.

2,2-Bis(ethyldicyclopentadienyl iron)butane is prepared by reacting together ethyldicyclopentadienyl iron and methyl ethyl ketone.

2,2-Bis(dicyclopentadienyl iron)propane is prepared by reacting together dicyclopentadienyl iron and acetone.

2,2-Bis(isopropyldicyclopentadienyl iron)propane is prepared by reacting together isopropyldicyclopentadienyl iron and acetone.

2,2-Bis(diphenyldicyclopentadienyl iron)butane is prepared by reacting together diphenyldicyclopentadienyl iron and methyl ethyl ketone.

1,2-bis(p-chlorophenyldicyclopentadienyl iron)-1-phenylethane is prepared by reacting together p-chlorophenyldicyclopentadienyl iron and acetophenone.

1,1-bis(o-methylphenyldicyclopentadienyl iron)-1-phenyl-n-propane is prepared by reacting together o-methylphenyldicyclopentadienyl iron and propiophenone.

2,2-bis(tricyclohexyldicyclopentadienyl iron)-1-phenyl-n-propane is prepared by reacting together tricyclohexyldicyclopentadienyl iron and methylbenzyl ketone.

2,2-bis(pyrrolidinodicyclopentadienyl iron)butane is prepared by reacting together pyrrolidinodicyclopentadienyl iron and methyl ethyl ketone.

2,2-bis(dichlorodicyclopentadienyl iron) propane is prepared by reacting together dichlorodicyclopentadienyl iron and acetone.

EXAMPLE 15

The procedure of Example 1 is repeated using, in lieu of ethylferrocene, a molar equivalent mixture of ferrocene and ethylferrocene to provide the 2-(ethyldicyclopentadienyl iron)-2-(dicyclopentadienyl iron)-propane product.

The procedure of this example is used to prepare the other unsymmetrical monosubstituted products of the present invention, for example, 2-(n-butyl-dicyclopentadienyl iron)-2-(dicyclopentadienyl iron)-propane, 2-(t-butyl-dicyclopentadienyl iron)-2-(dicyclopentadienyl iron)-propane, 2-(isopropyl-dicyclopentadienyl iron)-2-(dicyclopentadienyl iron)-propane, 2-(isopropyldicyclopentadienyl iron)-2-(dicyclopentadienyl iron)-butane, and so forth.

What is claimed is:

1. The process for the production of dimeric condensation product of a dicyclopentadienyl iron compound comprising reacting a dicyclopentadienyl iron compound with a ketonic coupling agent in the presence of a strong acid catalyst, in a two-phase system wherein the first phase comprises said strong acid and a polar organic solvent and the second phase comprises said iron compound, said ketonic coupling agent being added slowly to the two-phase system with agitation, said second phase being slightly soluble in said first phase.

2. The process according to claim 1 wherein said dimeric condensation product prepared is selected from those of the following formula:

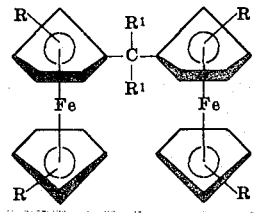

wherein each R, independently, is hydrogen, halo, alkyl, cyclo-alkyl, aryl, or a nitrogen, sulfur, or oxygen containing saturated or unsaturated monocyclic heterocyclic group and each $R^1$, independently, is alkyl, aryl, or aralkyl.

3. The process according to claim 2 conducted at a reaction temperature of between room temperature and the reflux temperature of the reaction mixture and under an inert atmosphere.

4. The process according to claim 3 wherein each R, independently, is hydrogen or alkyl.

5. The process according to claim 3 wherein each $R^1$ is methyl.

6. The process according to claim 3 wherein the polar organic solvent is a lower saturated aliphatic alcohol, the strong acid is an inorganic acid, each R, independently, is hydrogen or alkyl, and each $R^1$ is methyl.

7. The process according to claim 3 wherein the polar organic solvent is methanol, ethanol, or mixture thereof, the strong acid is sulfuric acid, and the reaction temperature is about the reflux temperature of the reaction mixture.

8. The process according to claim 7 wherein each R, independently, is hydrogen or alkyl and each $R^1$ is methyl.

9. The process according to claim 3 wherein the polar organic solvent is methanol, ethanol, or mixture thereof, the strong acid is sulfuric acid, the iron compound is ethyl ferrocene, and the ketonic coupling agent is acetone.

10. The process according to claim 9 wherein the polar organic solvent is methanol.

11. The compound selected from those represented by the formula:

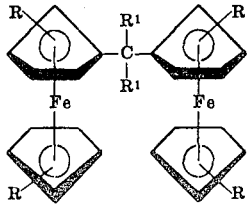

wherein each R, independently, is hydrogen, halo, alkyl, cycloalkyl, aryl, or a nitrogen, sulfur, or oxygen containing saturated or unsaturated monocyclic heterocyclic group and each $R^1$, independently, is alkyl, aryl, or aralkyl; at least one R being other than hydrogen.

12. The compound according to claim 11 wherein each $R^1$ is methyl.

13. The compound according to claim 11 wherein one R in each of the two dicyclopentadienyl iron moieties is alkyl.

14. The compound according to claim 13 wherein each $R^1$ is methyl.

15. The compound according to claim 14 which is 2,2-bis(ethyldicyclopentadienyl iron)propane.

* * * * *